(12) United States Patent
Shannon et al.

(10) Patent No.: US 10,962,509 B2
(45) Date of Patent: Mar. 30, 2021

(54) SYSTEM AND METHOD FOR DETECTING FAILED ELECTRONICS USING ACOUSTICS

(71) Applicants: Russell Shannon, Ocean Gate, NJ (US); Justin Tallent, Haddon Heights, NJ (US); Vontrelle Collins, Brick, NJ (US); John Carswell, Newtown, PA (US); Gregory Zucaro, Forest Hills, NY (US)

(72) Inventors: Russell Shannon, Ocean Gate, NJ (US); Justin Tallent, Haddon Heights, NJ (US); Vontrelle Collins, Brick, NJ (US); John Carswell, Newtown, PA (US); Gregory Zucaro, Forest Hills, NY (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 133 days.

(21) Appl. No.: 16/405,303

(22) Filed: May 7, 2019

(65) Prior Publication Data
US 2020/0355649 A1  Nov. 12, 2020

Related U.S. Application Data

(63) Continuation-in-part of application No. 15/666,857, filed on Aug. 2, 2017, now abandoned.

(51) Int. Cl.
*G01N 29/40* (2006.01)
*G01N 29/265* (2006.01)
(Continued)

(52) U.S. Cl.
CPC ......... *G01N 29/4427* (2013.01); *G01N 29/04* (2013.01); *G01N 29/265* (2013.01); *G01N 29/40* (2013.01); *G01N 2291/2697* (2013.01)

(58) Field of Classification Search
CPC .. G01N 29/4427; G01N 29/04; G01N 29/265; G01N 29/40; G01N 2291/2697
(Continued)

(56) References Cited

U.S. PATENT DOCUMENTS

| 6,089,095 | A | 6/2000 | Yang et al. |
| 7,694,568 | B2 * | 4/2010 | Hegen ............... G01N 29/28 73/627 |

(Continued)

OTHER PUBLICATIONS

The use of broadband acoustic transducers and pulse-compression techniques for air-coupled ultrasonic imaging, www.elsevier.nl/locate/ultras, School of Engineering, University of Warwick, Gan et al.TH Gan, DA Hutchins, DR Billson, DW Schindel—Ultrasonics, 2001—Elsevier (Year: 2001).*

(Continued)

*Primary Examiner* — Jacques M Saint Surin
(74) *Attorney, Agent, or Firm* — Mark O. Glut; NAWCAD

(57) ABSTRACT

An apparatus and method for detecting failed electronics using acoustics. The method comprising directing an acoustic wave toward a circuit component to be tested such that the acoustic wave is reflected off the circuit component, receiving the reflected acoustic wave, amplifying the reflected acoustic wave, and comparing the reflected acoustic wave with known acoustic waves to determine if the circuit component is operating properly. The apparatus comprising a data acquisition system for acquiring data, an X-Y-Z positioner to position two transducers and to hold the circuit component, and software to post-process and analyze the data. The data acquisition system further includes an oscilloscope, a pulser-receiver, two air-coupled transducers, and an amplifier.

2 Claims, 4 Drawing Sheets

Figure 1:
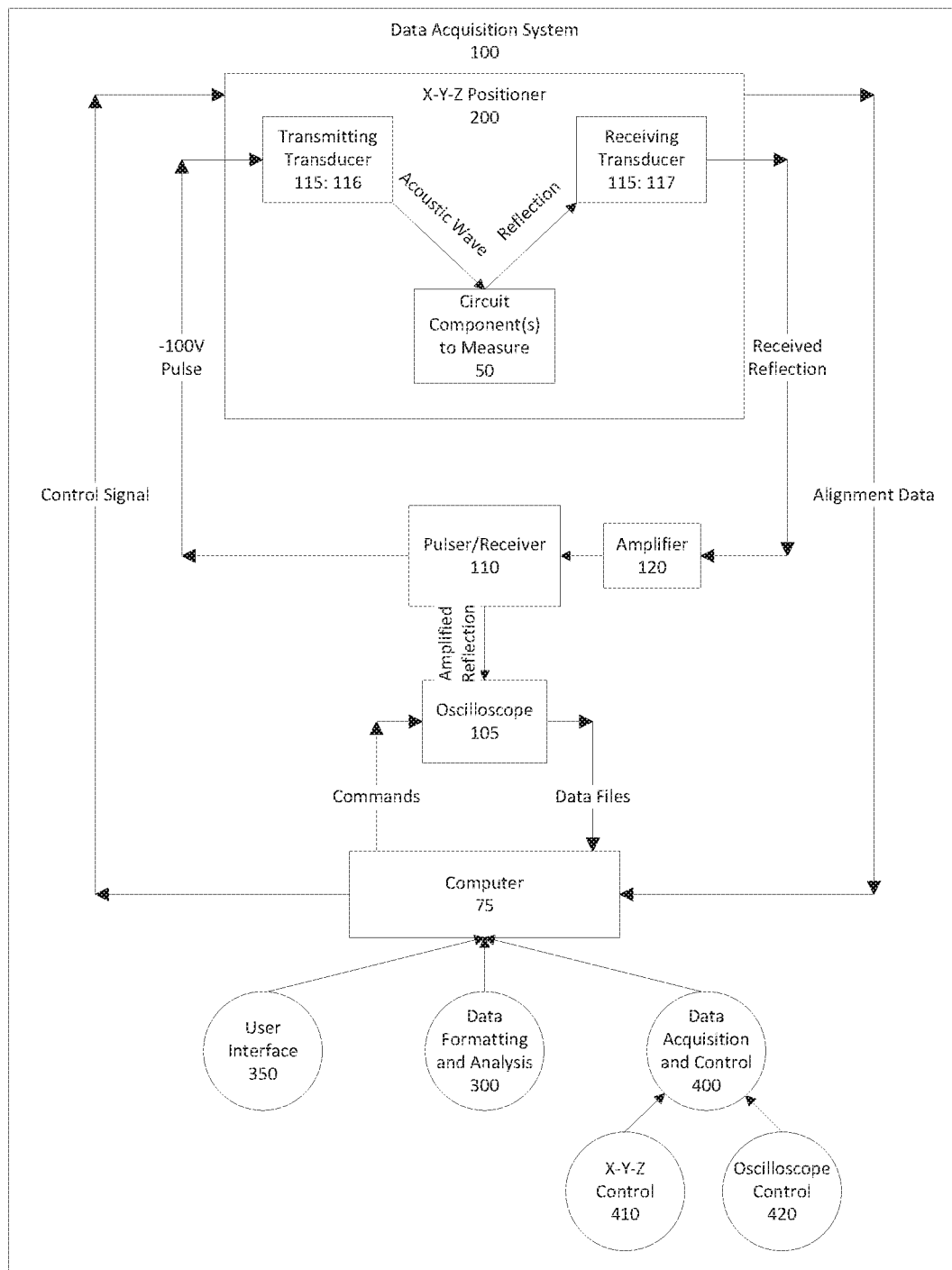

(51) Int. Cl.
*G01N 29/04* (2006.01)
*G01N 29/44* (2006.01)

(58) Field of Classification Search
USPC .......................................................... 73/602
See application file for complete search history.

(56) References Cited

U.S. PATENT DOCUMENTS

| 8,554,328 | B2 | 10/2013 | Faraji et al. | |
|---|---|---|---|---|
| 9,791,508 | B2* | 10/2017 | Smith | G01N 29/11 |
| 2006/0253025 | A1* | 11/2006 | Kaufman | A61B 8/0875 |
| | | | | 600/437 |
| 2012/0141552 | A1* | 6/2012 | Dalecki | A61K 9/00 |
| | | | | 424/400 |

OTHER PUBLICATIONS

Semmens, J.E.; Kessler, L.W., Further investigation into the use of acoustic micro imaging for analyzing flip chip integrity and failure modes, Multichip Modules, 1997, 6th International Conference, pp. 165-169, Apr. 2-4, 1997.

Ousten, et al, The use of impedance spectroscopy, SEM and SAM imaging for early detection of failure in SMT assemblies, Physical & Failure Analysis of Integrated Circuits, 1997, Proceedings of the 1997 6th International Symposium, pp. 74-79, Jul. 21-25, 1997.

Wright, R.G., Multiresolution sensor fusion approach to PCB fault detection and isolation, AUTOTESTCON, 2008 IEEE, vol, No. pp. 41-46, Sep. 8-11, 2008.

Reiten, et al, Laser Doppler vibrometry use in detecting faulty printed circuit boards, AUTOTESTCON, 2008 IEEE , pp. 33-36, Sep. 8-11, 2008.

Ogi, et al, Noncontact monitoring of surface-wave nonlinearity for predicting the remaining life of fatigued steels, Journal of Applied Physics, vol. 90, Issue 1, Jul. 2001 pp. 438-442.

Sharkey, et al, Acoustic emission, cylinder pressure and vibration: a multisensor approach to robust fault diagnosis, Neural Networks, 2000. IJCNN 2000, Proceedings of the IEEE-INNS-ENNS International Joint Conference, vol. 6, pp. 223-228, 2000.

Pon Varma, Detecting faults in structures using time-frequency techniques, Acoustics, Speech, and Signal Processing, 2001. Proceedings. (ICASSP '01). 2001 IEEE International Conference on , vol. 6, pp. 3593-3596, 2001.

Wright et al, Circuit Board Testing Through Multi-Spectral Signal Analysis, AUTOTESTCON 2005 Proceedings (IEEE Systems Readiness Technology Conference), 752-758, (2005).

Ballato, Acoustic Properties of Anisotropic Substrates, Proceedings of IEEE Ultrasonics Symposium, 66-69, 2003.

Lui, et al, A Novel Method and Device for Solder Joint Quality Inspection by Using Laser Ultrasound, Proceedings of the 50th ECTC (Electronic Components and Technology Conference), Las Vegas, Nevada, May 21-24, 408, (2000).

Rummler, et al, Reliability investigations of vibration excited circuit boards, Proceedings of International Conference and Exhibition of Micro Materials—MicroMat 2000, Berlin, Apr. 17-19, 2000.

Schnitzer, et al, Vibration measurement of microstructures by means of laseroptical modal analysis, Laser '99 Conference Proceedings, Munich, Jun. 14-18, 1999.

Kulosik, Characterization of the influence of structural modifications on the vibrational behaviour of circuit boards by means of laseroptical modal analysis, Proceedings of International Conference and Exhibition of Micro Materials—MicroMat '97, Berlin, Apr. 16-18, 1997.

Weglein, Integrated circuit inspection via acoustic microscopy, Sonics and Ultrasonics, IEEE Transactions on, vol 30.1 (1983), 40-42.

Liang, et al, A case study of the delamination analysis of plastic encapsulated microcircuits based on scanning acoustic microscope inspection. Prognostics and System Health Management Conference (PHM—2014 Hunan), 2014. IEEE, 2014.

Tismer, et al, Acoustic imaging of bump defects in flip-chip devices using split spectrum analysis. Ultrasonics Symposium (IUS), 2013 IEEE International. IEEE, 2013.

Kaushick, et al, A Review of the Role of Acoustic Sensors in the Modern Battlefield. 11th AIAA/CEAS Aeroacoustics Conference, May 23-25, 2005, Monterey, California.

Shannon, et al, A System for Detecting Failed Electronics Using Acoustics, 2018 IEEE AUTOTESTCON, pp. 178-182, National Harbor, MD, 2018.

* cited by examiner

SYSTEM AND METHOD FOR DETECTING FAILED ELECTRONICS USING ACOUSTICS

CROSS-REFERENCES

The present application is a continuation-in-part of application Ser. No. 15/666,857, filed Aug. 2, 2017, entitled "System and Method for Detecting Failed Electronics Using Acoustics." At the time of filing of the present application, application Ser. No. 15/666,857 is currently pending, and is incorporated herein by reference.

STATEMENT OF GOVERNMENT INTEREST

The invention described herein may be manufactured and used by or for the Government of the United States of America for governmental purposes without payment of any royalties thereon or therefor.

BACKGROUND

Currently, in order to diagnose a circuit card failure in the United States Navy and Marine Corps, machines that physically and electrically probe locations on a circuit card and take measurements are used. However, prior to utilizing these machines, the "conformal coating" (a protective coating around the circuit card made of silicone or polyurethane) must be removed from the card, then reapplied after testing and/or repair. Currently, outside of the United States military, complex laboratory systems are used to identify specific failure modes through acoustic imaging and analysis. These systems utilize technologies such as Scanning Acoustic Microscopy (SAM) and Laser Doppler Vibrometry to produce images of circuits and chips to identify failure mode and faults. These images are analyzed by software to find the source of a fault or failure. These techniques are costly and cannot be utilized in a military operating environment because of system size, complexity, fragility, and cost.

SUMMARY

The present invention is directed to a method and system for detecting failed electronics using low-cost Amplitude-scan (A-scan) acoustic methods, which are not based on imaging, with the needs enumerated above and below.

The present invention is directed to a method for detecting failed electronics using acoustics, the method comprising directing an acoustic wave, with a frequency in the megahertz (MHz) range, toward a circuit card or circuit component to be tested such that the acoustic wave is reflected off of the circuit card or circuit component, receiving the reflected acoustic wave, amplifying the reflected acoustic wave, and comparing the reflected acoustic wave with known acoustic wave properties to determine if the circuit card or circuit component is operating properly, or contains an internal fault.

The present invention is directed towards a method for detecting failed electronics using acoustics, the method comprising: moving two acoustic transducers over a test piece using a computer-controlled X-Y-Z positioner, the transducers being held at a 45 degree angle from each other; generating an acoustic wave that is directed towards the test piece; reflecting an acoustic wave off the test piece; receiving the reflected acoustic wave, the reflected acoustic wave having an amplitude and a frequency; adjusting distance of the transducers above the test piece through a range from 120 mils above, to 120 mils below, a default height, in 16 mil increments, such that the amplitude of the reflected acoustic wave is maximized by automatically returning the transducers to a height where the greatest amplitude was measured; amplifying the reflected acoustic wave; sampling the reflected acoustic wave; digitizing the reflected acoustic wave; digitally storing data from reflected acoustic wave data; averaging the reflected acoustic wave data via a built-in oscilloscope function and reading a predetermined sample rate that is saved in header information of each saved waveform file on the oscilloscope; saving the reflected acoustic wave data and the sample rate to a file; processing the file to remove data that occurs before and after the acoustic wave in time; calculating the following from raw waveform data in the file: noise level, total energy, average rate of change between two peaks, sample duration in time, difference in amplitude between a smallest peak 3 decibels (dB) above noise level and a global maximum peak in a time domain, time to maximum peak from a first peak, total power, center frequency, bandwidth, maximum amplitude of the acoustic wave in a frequency domain and its corresponding frequency; inputting the calculated features into a neural network that has been trained to compare reflected features of the acoustic wave with features from acoustic wave reflections from "known good" electronics; automatically making a determination based on neural network output if the test piece is operating properly; and, alerting a user as to health of the test piece via a graphical user interface.

The present invention is directed to a method of fault detection using acoustic testing and analysis to look for density changes in the material of a circuit or circuit component using air-coupled transducers with operating frequencies in the MHz range. These density changes are used as an indication of a fault or failure, in that circuit or circuit component, as the reflected acoustic wave will differ depending on density and structure of the material from which it is reflected.

It is a feature of the present invention to provide a method and system for detecting failed electronics using acoustics that is less expensive and less complex than currently available methods.

It is a feature of the present invention to provide a method and system for detecting failed electronics that does not require a user to remove and reapply a conformal coating on a circuit card.

It is a feature of the present invention to provide a method and system for detecting failed electronics that does not require a liquid coupling medium, but rather utilizes two air-coupled transducers to transmit and receive the acoustic waves. Generally, acoustic transducers are used to convert electrical energy into mechanical (sound) energy, and vice versa. Sound is a mechanical vibration of the air. In this method, one transducer is used to generate an acoustic wave by converting an electrical pulse (in one of the embodiments, a pulse of −100V) from a pulser-receiver into an acoustic wave with a frequency in the MHz range. Another transducer is used to turn the received acoustic wave (vibrations of the air reflected from the circuit component under test) into electrical energy that can be captured digitally and analyzed to determine the health of the circuit component under test.

DRAWINGS

Figure 2A:
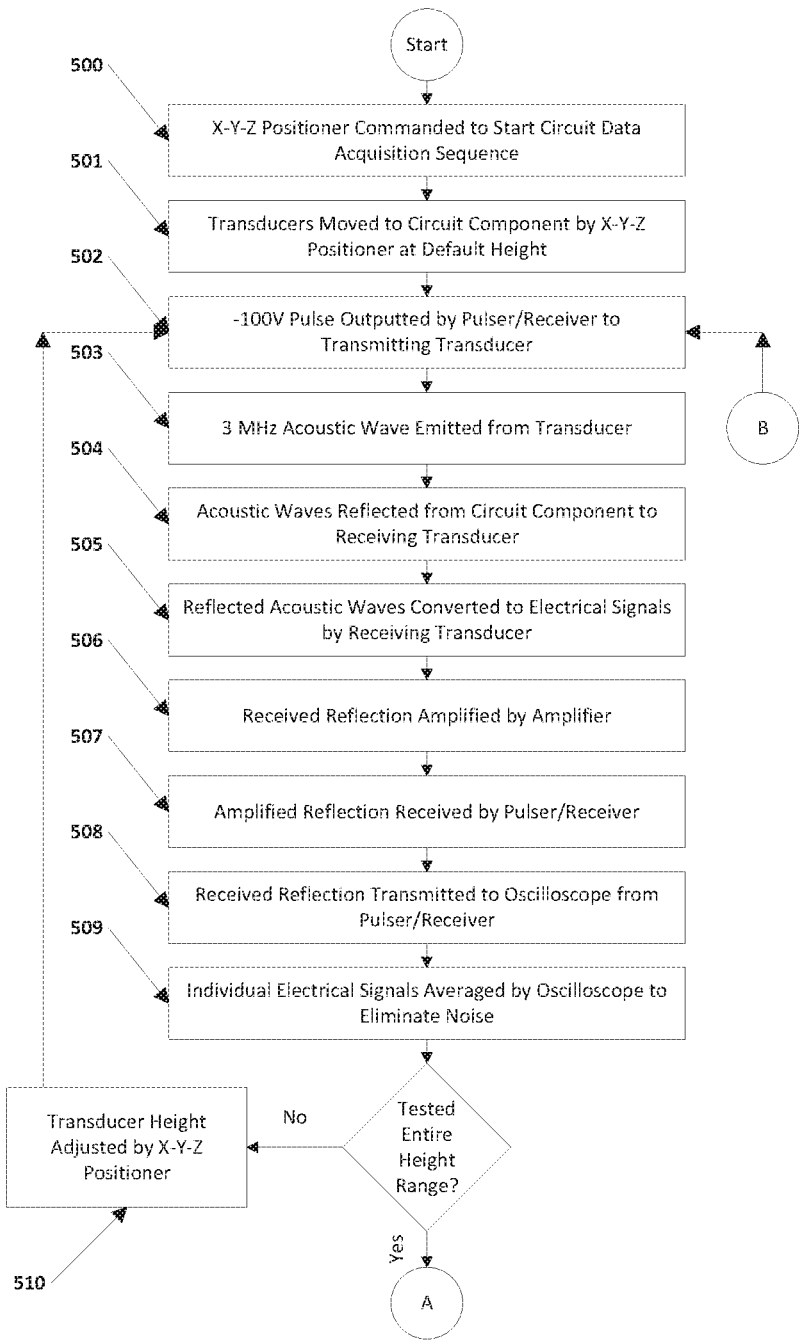
Figure 2B:
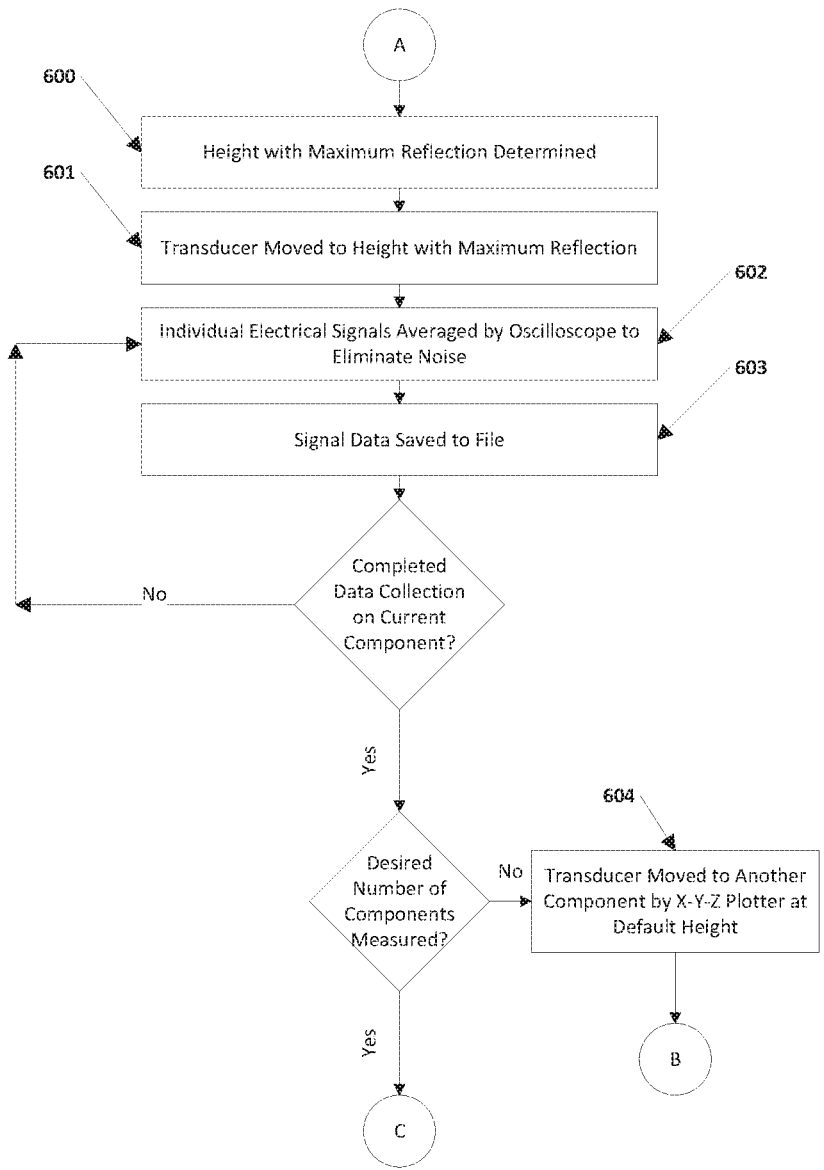
Figure 2C:
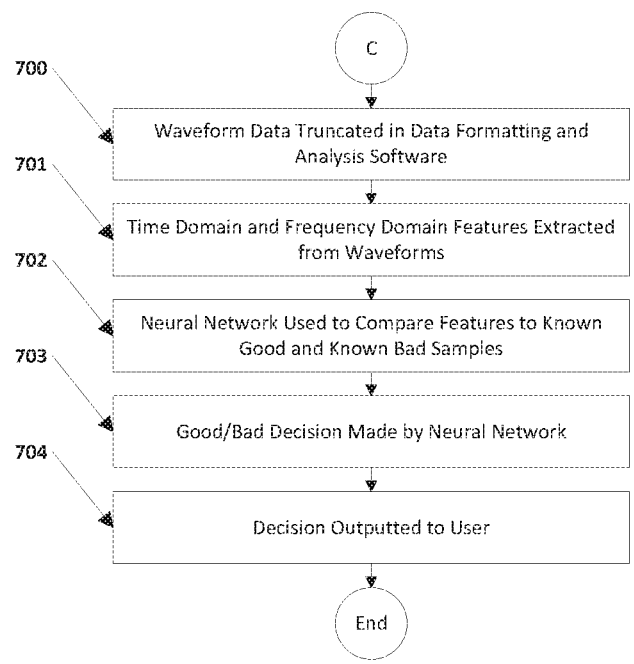

These and other features, aspects and advantages of the present invention will become better understood with reference to the following description and appended claims, and accompanying drawings wherein:

FIG. 1 is a diagram illustrating the flow of information and signals between hardware and software components in an automated embodiment of the system; and, FIGS. 2A, 2B, and 2C are flowcharts depicting the overall process for acquiring and analyzing data from a group of components using an automated embodiment of the system.

DESCRIPTION

The preferred embodiments of the present invention are illustrated by way of example below and in FIGS. 1, 2A, 2B, and 2C. FIG. 1 shows the flow of information in a fully automated embodiment of this system. In other embodiments, the positioning of the transducers and the control of the oscilloscope may be performed manually. Alternatively, the operating frequency of the transducers may vary in the megahertz range. Frequencies in the kilohertz (kHz) range may also be used in other embodiments, but may lead to a less accurate system, depending on the size of the density change in the material to be measured. In other embodiments, the transducers may require being driven by a voltage different from the −100V pulse output by the pulser-receiver described here.

In the description of the present invention, the invention will be discussed in an aircraft and ship environment. However, this invention can be utilized for any type of application that requires use of a method or system for detecting failed electronics.

As shown in FIG. 1, in one of the embodiments of the invention, the basic components of the invention are a data acquisition system 100 and an X-Y-Z positioner 200 to position two transducers 115 and to hold the circuit card (or test piece) 50 under test. The system is operated by data acquisition and control software 400, and data formatting and analysis software 300 to post-process and analyze the data. The data acquisition system 100 includes an oscilloscope 105, a pulser-receiver 110, two air-coupled acoustic transducers 115 (held by a transducer holder) built to operate at 2 MHz, an amplifier 120, and a personal computer 75. There are two pieces of software (data formatting and analysis software 300) running on the personal computer 75 to analyze data. One piece of software is used to analyze data from a single waveform from a component, circuit card 50, or test piece of unknown health and to provide a user a determination of health state of that component (i.e., "Good" or "Failed"). The second software program uses a priori knowledge of the health of the components being tested. This piece of software is designed to analyze the data from multiple waveforms in a population and determine the accuracy of the system itself. The data acquisition and control software 400 runs on a Windows-based personal computer 75 and contains two components referred to as an X-Y-Z control component 410 and an oscilloscope control component 420. The X-Y-Z control component 410 is used to control the X-Y-Z positioner 200, while the oscilloscope control component 420 controls the oscilloscope 105. Additionally, there is a user interface 350 written in LabVIEW that allows the operator to run the system. In another embodiment of this system, positioning of the transducers 115 and control of the oscilloscope 105 may be done manually.

The following method, shown in detail in FIGS. 2A, 2B, and 2C is used to acquire data in the automated embodiment of the system. As shown in FIG. 2A, all equipment is turned on (start) and the X-Y-Z positioner 200 is commanded to start the circuit data acquisition sequence (action 500 in FIG. 2A). The computer 75 will command the X-Y-Z positioner 200 to move to a pre-programmed position above a circuit card 50, component, or test piece of interest. Next, the transducers 115 are lowered to a default height by the X-Y-Z positioner 200 (action 501). The pulser-receiver 110 is turned on, so that it will then start outputting a voltage pulse to a transmitting transducer 116 (one of the two air-coupled acoustic transducers 115) (action 502), causing the transmitting transducer 116 to output 2 MHz sound (action 503). A receiving transducer 117 (the other air-couple acoustic transducer 115) will begin receiving any acoustic waves that are reflected from the test piece or circuit card 50 (action 504). The reflected acoustic waves are then converted by the receiving transducer 117 into an electrical signal (action 505). The reflections/electrical signals are amplified by the amplifier 120 (action 506), then received by the pulser-receiver 110 (action 507), and then fed into the oscilloscope 105 (action 508) to be displayed, measured, and stored. The oscilloscope 105 digitizes the incoming signal by sampling it at a user-defined frequency (an option in the oscilloscope operating software) in the gigahertz range (Ghz) and displays it to the screen of the oscilloscope 105. In order to eliminate noise, signals are captured from the oscilloscope 105 after the oscilloscope 105 has averaged the received signals a user-defined number of times (action 509). The maximum number of averages in this embodiment is 1024. In one of the embodiments, the oscilloscope contained a built-in function to average up to 1024 signals at a time. Other embodiments may collect individual (unaveraged) signals and average them away from the oscilloscope, for example, in a computer running a signal processing application. Next, the transducers 115 are moved through a predetermined height range below and above the default height (action 510). In this embodiment, the range is from 120 mils above to 120 mils below the default height, in 16 mil increments. A "mil" may be defined as, but without limitation, a unit representing one thousandth of an inch. The acoustic reflection's amplitude is averaged and measured at each height and stored. After each measurement at each height in the range is collected, a maximum reflection amplitude is found by searching the stored waveforms for the maximum height recorded (action 600 in FIG. 2B). Once the maximum reflection amplitude is determined, the transducers are then moved to the height associated with the maximum reflection amplitude (action 601). Subsequently, the all waveform data collected by the oscilloscope 105 is averaged in order to eliminate noise (action 602). The digitized waveform data is then saved to a file (action 603). In this embodiment, data is stored in a file format such that the top of the file contains information about the oscilloscope hardware and the data itself (sampling frequency and total number of samples), and the waveform data is stored in the files such that a single sample (a single amplitude value corresponding to a small fraction of time [the inverse of the sampling frequency]) is stored per line of the file. If a bulk analysis control program is executing, the X-Y-Z positioner 200 will then move to another circuit card 50 or circuit component (action 604) and start the process over (action 502 in FIG. 2A).

In the current invention, the transmitting transducer 116 is used to generate an acoustic wave by converting an electrical pulse from a pulser-receiver 110 into an acoustic wave with a frequency in the MHz range. The receiving transducer 117 is used to turn the received acoustic wave into electrical energy that can be captured and stored digitally. The computer 75 acts as the "brain" of the data acquisition system. It is used to run software to control the oscilloscope 105, control the X-Y-Z positioner 200, display, capture, and store data from the oscilloscope 105, and to analyze the acquired data. The pulser-receiver 110 generates an electrical pulse to drive the transmitting transducer 116 to generate an acoustic wave in the air and receives the electrical signal representing the acoustic wave at the receiving transducer 117 (i.e., the reflection). Amplification of the received signal is accomplished via an in-line amplifier 120 on a receiver input of the pulser-receiver 110. Finally, the pulser-receiver 110 sends the amplified signal to an input on one channel of the oscilloscope 105. The oscilloscope 105 receives incoming signals from the pulser-receiver 110 and immediately digitizes and graphically displays them to the user of the oscilloscope 105. The oscilloscope 105 averages incoming signals a user-defined number of times to eliminate Gaussian noise. This results in a stable signal with very little noise. The stable signal can then be captured and stored internally on the oscilloscope's hard drive. In this embodiment, the oscilloscope used an embedded version of the Windows operating system. Finally, when commanded by the computer 75, the oscilloscope 105 automatically transfers the stored information to the computer 75 for analysis via a universal serial bus (USB) interface.

In several of the embodiments, the same analysis algorithms and post-processing techniques are applied to the data automatically. In order to determine whether a single recorded waveform (a reflection from a circuit card 50, test piece, or component) is an indicator of a healthy component or of a failed component, the following analysis steps are taken. First, the header information in the raw data file is read. The sampling frequency that was used to record the data is taken from the header information along with a count of the number of samples in the file. This information is used to calculate the time duration of the recorded acoustic waveform. The raw waveform data is then stored in computer memory (as an array) for further analysis. Even though the signal was averaged, there may still be noise in the signal. Therefore, a measured noise level is calculated from the raw data. Next, an algorithm is used to identify all of the peaks and troughs of the waveform 3 dB above the measured noise threshold and 3 dB below the negative value of the measured noise threshold. The algorithm uses this information and the measured noise level to identify the start and end of the wave in the data. The data determined to be before and after the wave in time is deleted from the file, leaving a file with only the waveform of interest contained in the data, i.e. truncated waveform data (action 700 shown in FIG. 2C). Several "features" are then calculated from the raw waveform data, particularly time domain features and frequency domain features (action 701). The features calculated are: total energy, average rate of change between two peaks, sample duration in time, difference in amplitude between the smallest peak above the noise level and the global maximum peak in the time domain, the time to the maximum peak from the first peak, total power, center frequency, bandwidth, maximum amplitude of the signal in the frequency domain, and the corresponding frequency at which the maximum amplitude occurs.

From each feature set, neural networks were created for each type of component in order to determine the health of the component from its acoustic reflection alone. For each component type, half of the data was used as a training set to train a network specific to that component. The remaining data was used to determine the accuracy of the technique, given a priori knowledge of the health of all components. The feature arrays, as well as one-dimensional arrays of component labels (good=1, bad=0), were used as input and target arrays, respectively, for training the neural networks.

In this embodiment, MATLAB's built-in neural network pattern recognition tool (nprtool) was used to create the neural networks and to then determine their accuracies. However, there is a myriad of other possible tools and algorithms for creating and training neural networks that are available to those skilled in the art. A default training/validation/testing set split of 70%/15%/15% was chosen in one of the embodiments. However, it was possible to enlarge the testing set for a better understanding of the network accuracies. In this embodiment, it was found that using ten hidden neurons yielded the best results. The networks were trained using these settings and a confusion matrix was generated in order to determine accuracy. The networks were trained several times and those networks with the highest accuracies were used in this embodiment. Finally, the non-training data was applied to the networks to determine the true accuracy.

As described above, the neural network has been trained to use these features to determine failed and healthy test pieces or components by comparing features of the test piece or circuit card 50 to known good and known bad samples (actions 702 and 703). An individual neural network is trained for each circuit component type to which this method is applied. The output of the neural network is displayed to the user (action 604) via a GUI as either the word "Good" or "Failed" (action 703). The bulk analysis GUI output is a percentage accuracy from multiple iterations of the method described above.

In one of the embodiments of the invention, the transducer holder is attached to the X-Y-Z positioner 200 and positions the two air-coupled transducers 115 at a 45-degree angle to the top of the circuit card, or component under test 50 such that maximum acoustic reflection is achieved. Maximum acoustic reflections are achieved when an acoustic source is at an angle of 45 degrees from the surface off of which it is reflecting.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A method for detecting failed electronics using acoustics, the method comprising:
    moving two acoustic transducers over a test piece;
    generating an acoustic wave that is directed towards the test piece;
    reflecting the acoustic wave off the test piece;
    receiving the reflected acoustic wave, the reflected acoustic wave having an amplitude and a frequency;
    adjusting distance of the transducers from the test piece through a range from 120 mils above, to 120 mils below, a default height, in 16 mil increments, using a computer-controlled X-Y-Z positioner, such that the amplitude of the reflected acoustic wave is maximized by automatically returning the transducers to a height where the greatest amplitude was measured;

amplifying the reflected acoustic wave;
sampling the reflected acoustic wave;
digitizing the reflected acoustic wave;
digitally storing data from reflected acoustic wave data;
averaging the reflected acoustic wave data via a built-in oscilloscope function and reading a predetermined sample rate that is saved in header information of each saved waveform file on the oscilloscope;
saving the reflected acoustic wave data and the sample rate to a file;
processing the file to remove data that occurs before and after the acoustic wave in time;
calculating the following from raw waveform data in the file: total energy, average rate of change between two peaks, sample duration in time, difference in amplitude between a smallest peak above noise level and a global maximum peak in a time domain, time to maximum peak from a first peak, total power, center frequency, bandwidth, maximum amplitude of the acoustic wave in a frequency domain and its corresponding frequency;
inputting the calculated features into a neural network that has been trained to compare reflected features of the acoustic wave with features from acoustic wave reflections from "known good" electronics;
making a determination if the test piece is operating properly; and,
alerting a user as to health of the test piece.

2. The method of claim 1, wherein the distance of the transducers from the test piece was automatically adjusted through a range from 120 mils above, to 120 mils below, the default height, in 16 mil increments, using a computer-controlled X-Y-Z positioner, such that the amplitude of the reflected acoustic wave is maximized by automatically returning the transducers to the height where the greatest amplitude was measured:
moving the acoustic transducers to an initial default distance;
moving the acoustic transducers through a predetermined distance range from above and below the initial default distance;
measuring acoustic reflection amplitude at each distance;
digitally storing the acoustic reflection amplitude found at each distance;
searching distance values to determine maximum reflection amplitude; and,
moving the transducers to a position at which the largest amplitude was measured.

* * * * *